US012313851B2

(12) United States Patent
Franz (10) Patent No.: US 12,313,851 B2
(45) Date of Patent: May 27, 2025

(54) DEVICE FOR GENERATING AND DISPLAYING AN IMAGE ON AN OBSERVATION FIELD USING A MULTIFUNCTIONAL DIFFRACTIVE ELEMENT

(71) Applicant: OQmented GmbH, Itzehoe (DE)

(72) Inventor: Stefan Franz, Jena (DE)

(73) Assignee: OQmented GmbH, Itzehoe (DE)

( * ) Notice: Subject to any disclaimer, the term of this patent is extended or adjusted under 35 U.S.C. 154(b) by 0 days.

(21) Appl. No.: 18/543,410

(22) Filed: Dec. 18, 2023

(65) Prior Publication Data
US 2024/0210702 A1 Jun. 27, 2024

(30) Foreign Application Priority Data
Dec. 21, 2022 (DE) ...................... 10 2022 134 418.5

(51) Int. Cl.
*G02B 27/01* (2006.01)
*G02B 27/10* (2006.01)
(Continued)

(52) U.S. Cl.
CPC ....... *G02B 27/0172* (2013.01); *G02B 27/104* (2013.01); *G02B 27/30* (2013.01); *G02B 27/4227* (2013.01); *G02B 2027/0178* (2013.01)

(58) Field of Classification Search
CPC .. G02B 27/0172; G02B 27/104; G02B 27/30; G02B 27/4227; G02B 2027/0178;
(Continued)

(56) References Cited

U.S. PATENT DOCUMENTS 9,632,312 B1 *  4/2017  Cakmakci .......... G02B 27/0172
11,435,572 B2 *  9/2022  Yeoh .................... G02B 6/0016
(Continued)

FOREIGN PATENT DOCUMENTS

DE  10 2017 211 932 A1  1/2019
DE  10 2018 201 525 A1  7/2019
(Continued)

OTHER PUBLICATIONS

Andrzej Kowalik et al., "Efficient Diffractive Collimator for Edge-Emitting Laser Diodes," *Proc. of SPIE*, vol. 6187, Photon Management II, 6 pages (Apr. 25, 2006).
(Continued)

*Primary Examiner* — Henry Duong
(74) *Attorney, Agent, or Firm* — Christensen, Fonder, Dardi & Herbert PLLC; John P. Fonder (57) ABSTRACT

A device for generating and displaying an image on an observation field provided for overlaying information and images, including at least one light source for emitting at least one divergent light bundle, a microscanner for variable deflection of the at least one light bundle in a direction of the observation field, wherein the microscanner has at least one axis of rotation for a rotational oscillating movement for deflecting the light bundle, a waveguide which is arranged in a beam path of the light bundle between the light source and the microscanner, a diffractive element which is arranged on or in the waveguide in such a way that the light bundle emitted by the at least one light source is transmitted through the diffractive element before it reaches the microscanner, and a light bundle deflected by the microscanner is coupled into the waveguide through the diffractive element.

12 Claims, 5 Drawing Sheets

(51) Int. Cl.
  G02B 27/30 (2006.01)
  G02B 27/42 (2006.01)
(58) Field of Classification Search
  CPC .............. G02B 26/101; G02B 27/0944; G02B 2027/0174; G02B 27/01; G02B 27/0101; G02B 27/0103; G02B 27/0149; G02B 27/017; G02B 27/0176; G02B 27/0179; G02B 27/0189; G02B 2027/0105; G02B 2027/0107; G02B 2027/0109; G02B 2027/011; G02B 2027/0112; G02B 2027/0114; G02B 2027/0116; G02B 2027/0118; G02B 2027/012; G02B 2027/0121; G02B 2027/0123; G02B 2027/0125; G02B 2027/0127; G02B 2027/013; G02B 2027/0129; G02B 2027/0132; G02B 2027/0134; G02B 2027/0136; G02B 2027/0138; G02B 2027/014; G02B 2027/0141; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0181; G02B 2027/0183; G02B 2027/0185; G02B 2027/0187; G02B 2027/019; G02B 2027/0192; G02B 2027/0194; G02B 2027/0196; G02B 2027/0198

USPC ........................................................ 359/630
See application file for complete search history.

(56) References Cited

U.S. PATENT DOCUMENTS

| | | |
|---|---|---|
| 2015/0062707 A1 | 3/2015 | Simmonds et al. |
| 2018/0120559 A1* | 5/2018 | Yeoh ................... G02B 5/3083 |
| 2018/0321736 A1 | 11/2018 | Masson |
| 2021/0072553 A1 | 3/2021 | Danziger et al. |
| 2021/0278587 A1* | 9/2021 | Schowengerdt ... G02B 27/0172 |
| 2022/0057633 A1 | 2/2022 | Song et al. |
| 2022/0269079 A1* | 8/2022 | Adema .............. G02B 26/0833 |

FOREIGN PATENT DOCUMENTS

| | | |
|---|---|---|
| DE | 10 2019 219 520 A1 | 6/2021 |
| DE | 10 2021 116 151 B3 | 6/2022 |
| WO | WO 2021/122948 A1 | 6/2021 |
| WO | WO 2022/058740 A1 | 3/2022 |

OTHER PUBLICATIONS

Petrak, Oleg, et al., "Laser Beam Scanning Based AR-Display Applying Resonant 2D MEMS Mirrors," *Proc. of SPIE*, vol. 11765, 18 pages (Mar. 28, 2021).

* cited by examiner

DEVICE FOR GENERATING AND DISPLAYING AN IMAGE ON AN OBSERVATION FIELD USING A MULTIFUNCTIONAL DIFFRACTIVE ELEMENT

PRIORITY CLAIM

The present application claims priority to German Patent Application No. 10 2022 134 418.5, filed on Dec. 21, 2022, which said application is incorporated by reference in its entirety herein.

FIELD OF THE INVENTION

The invention is directed to a projection device for generating and displaying an image on an observation field which is provided for projecting augmented reality and which can be in particular a lens of eyeglasses or a retina of a user of augmented reality goggles.

BACKGROUND OF THE INVENTION

Augmented reality (AR) refers to the computer-based augmentation of the perception of reality which operates on at least one of the human sensory modalities. However, AR is often understood to mean merely the visual display of information, namely, the supplementing of pictures or videos by overlaying or superimposing additional, computer-generated information and/or virtual objects. In particular, a frequent application of AR consists in the visual display or projection of images, user interfaces or information, such as directions, weather information or news, and is increasingly applied in AR eyeglasses or goggles, as they are called, which can display images, user interfaces or information directly on the lenses of the eyeglasses or on the retina of a user.

A microscanner (also known as MEMS, short for microelectromechanical system) can be used to project images or textual information. A light bundle which is generated by a light source arranged, for example, in a temple of eyeglass frames and which is subsequently shaped is deflected onto the MEMS scanner. The MEMS scanner can then scan the light bundle so that an image is generated on an observation field. An imaging system of this kind with a MEMS scanner requires comparatively few optical elements so that compact, inexpensive projectors can be realized. For AR applications, a projector must achieve a very high optical resolution and consume very little power. Therefore, for lack of alternatives, edge emitters are often used as light sources. However, these edge emitters emit a strongly divergent, elliptically-shaped light bundle which must be collimated.

A MEMS scanner is described, for example, in DE 10 2021 116 151 B3. The MEMS scanner disclosed therein can execute oscillations rotating simultaneously around two resonant oscillation axes in order to bring about a nonlinear Lissajous projection on an observation field by deflecting a light beam incident upon a deflecting element during the oscillations.

As a result of the oscillations, a field of view (FOV) is scanned with high frequencies in a scanning pattern corresponding to a Lissajous figure. Accordingly, in contrast to conventional raster scanning methods which scan the FOV periodically from top to bottom with maximum resolution, hundreds of partial images can be processed simultaneously and a more fluid motion depiction is enabled. Moreover, artifacts in the three-dimensional perception of rapidly moving objects are sharply reduced.

Data glasses, a projection device for data glasses and a method for operating the projection device are known from DE 10 2017 211 932 A1 for beam shaping and for collimation. The disclosed projection device has a light source for emitting at least one light beam, a deflection element for projecting an image on a retina of a user, a reflective element for reflecting the light beam onto the deflection element, and an adaptive optical element for adaptive modification of at least one beam parameter. If necessary, the projection device can also have collimating elements for the light beam.

A further imaging/display device disclosed in DE 10 2019 219 520 A1 comprises a light source, a deflection element and a lens arrangement arranged between the light source and the deflection element. The lens arrangement has two cylindrical lenses with which different beam profiles can be generated in two axes. A light beam emitted by the light source can be collimated and shaped through the cylindrical lenses.

A further projection device for data glasses is known from DE 10 2018 201 525 A1. This further projection device has a light source for emitting a light beam, at least one deflection element for projecting an image on a retina of a user, and a reflective element for reflecting the light beam on a first deflection element. The projection device further has a light guide between the light source and the reflective element. The light guide serves to guide the light emitted by the light source to a deflection element. Further, an image quality is improved by the light guide, since modes which do not correspond to a fundamental mode of the light guide are filtered out of the light beam when the light beam is coupled into the light guide, and less interference light arrives in a beam path of the light beam.

An additional optical element for collimating the light bundle emitted by a light source is always provided in the described projection devices. Since the installation space in AR goggles is limited and design aspects play a significant role in AR goggles, it is disadvantageous to integrate many optical elements with relatively large path lengths in AR goggles, such as telescopic arrangements with a plurality of lenses. Moreover, the number of component parts also disadvantageously affects the adjustment effort during assembly of the projection device, which increases as the quantity of component parts increases.

The scanning of a light bundle emitted by a laser diode over an observation field is also known as laser beam scanning (LBS).

A display for a near-eye display of images is disclosed in WO 2021/122948. The display comprises a light source for emitting light in direction of a waveguide, the waveguide, and a first optical element which is provided on the waveguide and is configured in such a way that it receives light and couples it into the waveguide. LBS can be used to display the images.

A fundamental problem in LBS projection devices in which light bundles are to be coupled into a waveguide is the limited available installation space in which the optical elements required for beam shaping and the optical elements serving to couple the light bundles into the waveguide in a beam path of the light bundles must be arranged.

SUMMARY OF THE INVENTION

Therefore, it is the object of the invention to find a novel possibility for generating images and displaying images on an observation field for AR data projection which has a high optical resolution and low power consumption while using few optical elements and little installation space.

This object is met by means of a device for generating and displaying an image on an observation field provided for overlaying information and images, comprising at least one light source for emitting at least one divergent light bundle, a microscanner for variable deflection of the at least one light bundle in direction of the observation field, which microscanner is formed to be rotationally pivotable around at least one rotational axis, a waveguide which is arranged in a beam path of the at least one light bundle between the at least one light source and the microscanner, and a diffractive element which is arranged on or in the waveguide in such a way that the at least one light bundle emitted by the at least one light source is transmitted through the diffractive element before it reaches the microscanner, and a light bundle deflected by the microscanner is coupled into the waveguide through the diffractive element.

Within the meaning of the invention, the generation and display of an image means the generation and display of an image, of a plurality of images or of a series of images. User interfaces or information such as directions, weather information or news can also be displayed on the observation field with a device according to the invention.

The observation field is advantageously at least one optical surface, for example, at least one beamsplitter or a holographic optical element (HOE), which is arranged in an eyeglass lens of AR goggles or on a windshield of a motor vehicle. Alternatively, the observation field is at least a retina of a user.

The diffractive element is an optical element on which microstructures are applied. A phase of the at least one light bundle and an intensity pattern of the light bundle can be modulated on the diffractive elements. The modulation is carried out through diffraction of the at least one light bundle at the diffractive element. Accordingly, the at least one light bundle can be collimated, deflected, shaped and/or split and astigmatisms of the at least one light bundle can be influenced, preferably eliminated.

The at least one waveguide is substantially plate-shaped and comprises a material through which a light bundle emitted by the light source can propagate. The at least one light bundle preferably propagates through total internal reflection at the outer surfaces of the waveguide. To this end, the at least one light bundle must be coupled into the waveguide at an angle that is greater than an angle of total internal reflection. The angle of total internal reflection depends on the material from which the waveguide is made. The at least one waveguide may comprise a plurality of layers or only one layer. The waveguide is preferably a glass plate. In a particularly preferable manner, the waveguide is an eyeglass lens of augmented reality goggles or the windshield of a motor vehicle.

By mounting the diffractive element on or in the at least one waveguide, the installation space required for the device for generating and displaying an image on an observation field provided for overlaying information and images is considerably reduced, since no additional optical elements are required for collimation, deflection, shaping, influencing astigmatisms and/or splitting.

Further, a cover glass which protects the outside of the waveguide and/or the diffractive element against external influences can be arranged on the waveguide, particularly on outer sides of the waveguide on which a diffractive element is arranged. It is particularly preferable that a cover glass is arranged on both outer sides of the waveguide.

In an advantageous matter, the diffractive element is formed to split the light bundle emitted by the at least one light source. Particularly advantageously, the diffractive element is formed to split only light bundles which come from the microscanner and are incident on the diffractive element. The splitting of the at least one light bundle is particularly advantageous for the projection of the light bundle on the observation field because more partial images can be displayed simultaneously with a split beam path of the at least one light bundle.

The diffractive element is advantageously formed as optical grating. The diffractive element can advantageously be formed as amplitude grating and/or as phase grating, particularly blazed grating. Further, a slanted edge grating, zone plates and/or holographic gratings (HOE), for example, can also be used as diffractive elements. Optical gratings can either be arranged on a surface of the waveguide or inserted directly into the diffractive element, as a result of which costs and outlay in the production of the device for generating and displaying an image on an observation field remain low or decrease, since no additional optical elements are needed in the beam path of the at least one light bundle.

The diffractive element can be configured to shape a beam cross section of the at least one light bundle in order to reduce an ellipticity of the at least one light bundle. It is necessary to reduce the ellipticity of the at least one light bundle in particular to achieve a very good optical resolution because additional imaging errors can be produced by light bundles with an elliptical beam cross section.

The diffractive element can be configured to influence astigmatisms of the at least one light bundle. In particular, the elimination of astigmatisms of the at least one light bundle is useful for improving the optical resolution.

The diffractive element should advantageously have an anamorphic effect and should collimate and rectify the divergent beam bundle emitted by the light source, i.e., should eliminate astigmatisms and reduce an ellipticity of the beam cross section.

Further, the diffractive element can be configured to collimate the light bundle emitted by the at least one light source. At least one additional optical element for collimating and/or deflecting the at least one light bundle can be arranged in the beam path of the at least one light bundle between the light source and the diffractive element.

The diffractive element can be configured to deflect the light bundle emitted by the at least one light source. The diffractive element can be configured in particular to deflect the at least one light bundle in direction of the microscanner and/or to deflect the at least one light bundle in such a way that it impinges perpendicularly on the microscanner.

The at least one light source is advantageously formed as edge emitter, surface emitter or as fiber-coupled laser light source. Surface emitters and fiber-coupled light sources have the advantage that the light bundles emitted by these light sources are generally less divergent than the light bundles emitted by edge emitters. On the other hand, the acquisition costs of surface emitters and fiber-coupled light sources are generally higher compared to edge emitters. In a particularly advantageous manner, a laser diode or a fiber-coupled laser can be used as light source.

The at least one light source can be configured to emit a plurality of light bundles with spectral compositions differing from one another in pairs. Alternatively, the at least one light source can be formed to emit a plurality of light bundles of like spectral composition. To this end, the light source can have a plurality of individual light sources at a given distance from one another. The distance between the light bundles emitted by the individual light sources can preferably be adjusted by an additional optical element. The use of a line light source is particularly sensible when the microscanner is formed to be rotatable around only one axis of rotation because an image can then be produced in two dimensions by simultaneously controlling the line light source and microscanner.

Further, an additional optical element can be arranged between the at least one light source and the microscanner, this additional optical element being configured in such a way that the light bundles with spectral compositions differing from one another in pairs or with like spectral composition which impinge on the additional optical element under angles differing from one another in pairs are combined to form an individual light bundle. Alternatively, the diffractive element can be configured in such a way that the light bundles with spectral compositions differing from one another in pairs or with like spectral composition are combined to form an individual light bundle.

The microscanner can be formed in particular as a microelectromechanical system (MEMS) and can be configured to bring about a nonlinear Lissajous projection in the observation field. The microscanner is formed to scan the light bundle over the observation field so that an image is generated on the observation field. By scanning the at least one light bundle along a Lissajous figure, hundreds of partial images can be processed simultaneously allowing a more fluid depiction of movement. Further, artifacts in the user's three-dimensional perception of rapidly moving objects are sharply reduced.

In a particularly advantageous manner, the microscanner is formed to be rotatable around exactly two axes of rotation orthogonal to one another and oscillates by its resonant frequency around the two rotational axes. The microscanner can also be formed rotatable around only one rotational axis and the light source is formed so as to emit a plurality of adjacently arranged light bundles in line shape.

The above-stated object is further met by augmented reality goggles comprising a device for generating and displaying images according to one of the embodiments described above.

BRIEF DESCRIPTION OF THE DRAWINGS

The invention will be described in more detail in the following through embodiment examples with reference to drawings. The drawings show.

DETAILED DESCRIPTION

Figure 1:
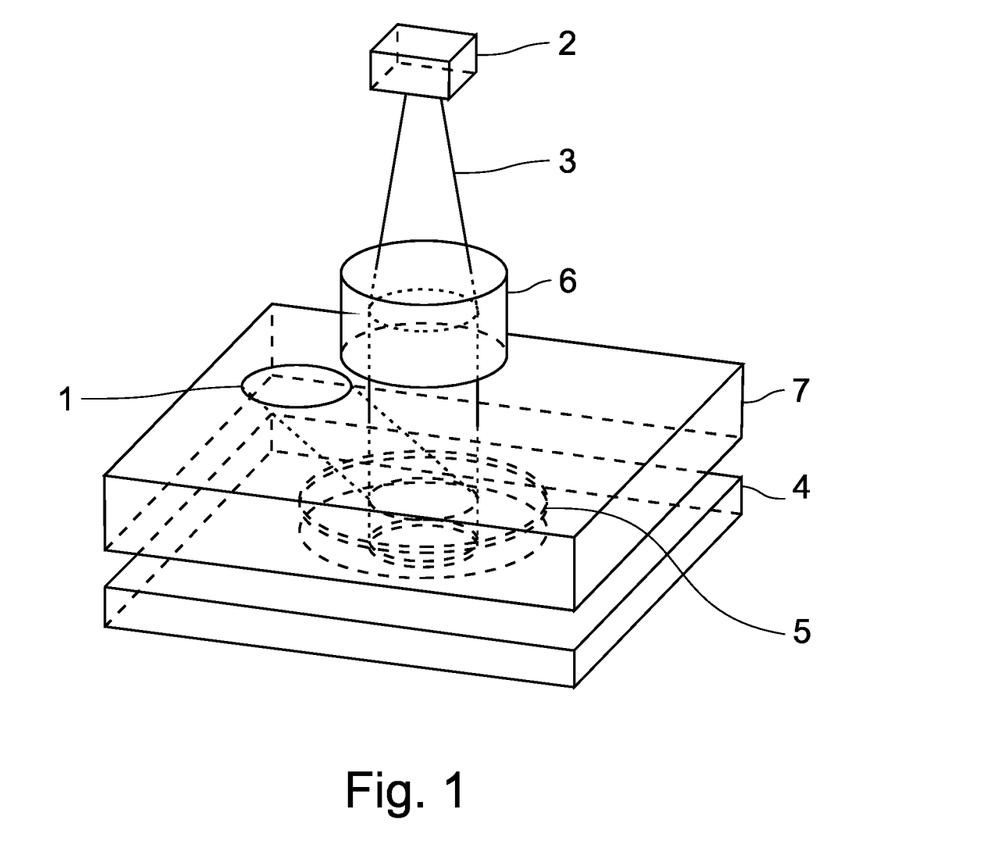
FIG. 1 a view of a first embodiment of a device for generating and displaying an image on an observation field with a light source, an additional optical element, a diffractive element arranged at a waveguide, a microscanner, and a beam path of a light bundle.

FIG. 1 shows a first embodiment of a device for generating and displaying an image on an observation field 1, with a light source 2 which emits a divergent light bundle 3, a microscanner 4, a diffractive element 5 arranged at a waveguide 7, an additional optical element 6 and a beam path of the light bundle 3. The diffractive element 5 is installed in a waveguide 7 and is circular. In the first embodiment example, the light source 2 is constructed as an area emitter and emits a light bundle 3 having a beam cross section that is circular. Accordingly, no additional diffractive elements 5 are needed for shaping a beam cross section of the light bundle 3. The additional optical element 6 is arranged in the beam path of the light bundle 3 between the light source 2 and the waveguide 7 and is configured to collimate the divergent light bundle 3. The light bundle 3 enters the waveguide 7 perpendicularly and impinges perpendicularly on the diffractive element 5 which is arranged in the beam path of the light bundle 3 between the additional optical element 6 and the microscanner 4. The light bundle 3 is transmitted through the diffractive element 5 and impinges subsequently on the microscanner 4. The light bundle 3 is deflected in direction of the observation field 1 by the microscanner 4.

In the first embodiment example, the observation field 1 comprises an optical surface, for example, a beamsplitter or a holographic optical element (HOE) which is installed in an eyeglass lens of AR goggles.

Figure 2:
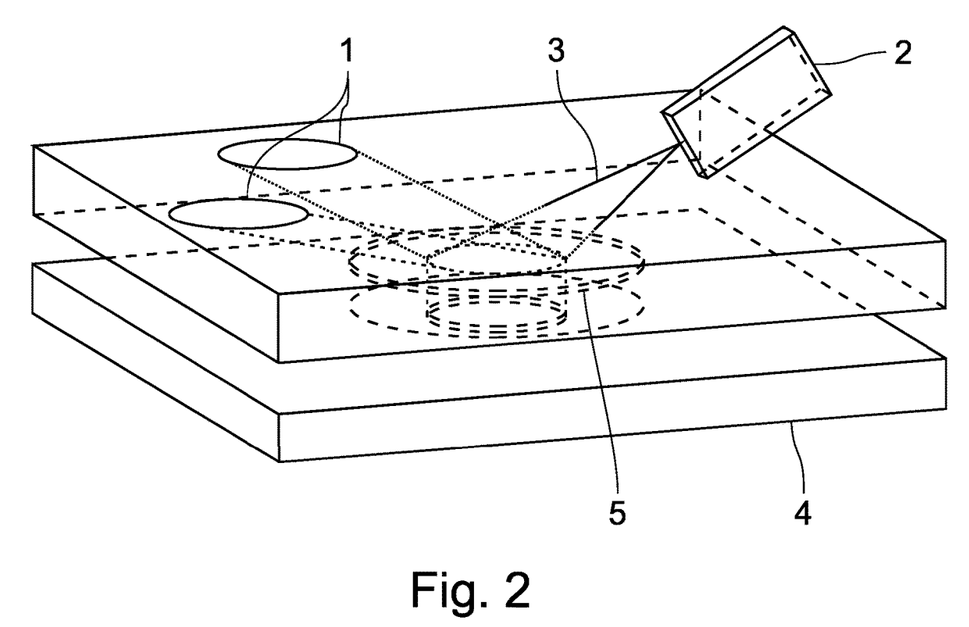
FIG. 2 a view of a second embodiment of a device for generating and displaying an image on the observation field with the light source, the diffractive element arranged at the waveguide, the microscanner and the beam path of the light bundle.

FIG. 2 shows a second embodiment of the device for generating and displaying an image on the observation field 1. The light bundle 3 emitted by the light source 2, which is formed as an edge emitter, is obliquely incident in the waveguide 7 and enters the latter. The light bundle 3 is elliptically shaped and divergent. In the waveguide 7, the light bundle 3 impinges on the diffractive element 5. The diffractive element 5 shapes a beam cross section of the light bundle 3, wherein an ellipticity of the light bundle 3 is reduced. Further, the light bundle 3 is deflected in direction of the microscanner 4 and collimated through the diffractive elements 5.

The light bundle 3 is deflected and collimated by the diffractive element 5 in such a way that it impinges perpendicularly on the microscanner 4. The microscanner 4 deflects the light bundle 3 so that the light bundle 3 is scanned over the observation field 1 and an image is generated on an observation field 1.

In the second embodiment example, the observation field 1 comprises two optical surfaces, for example, beam splitters or HOEs, which are inserted in an eyeglass lens of AR goggles.

Figure 3:
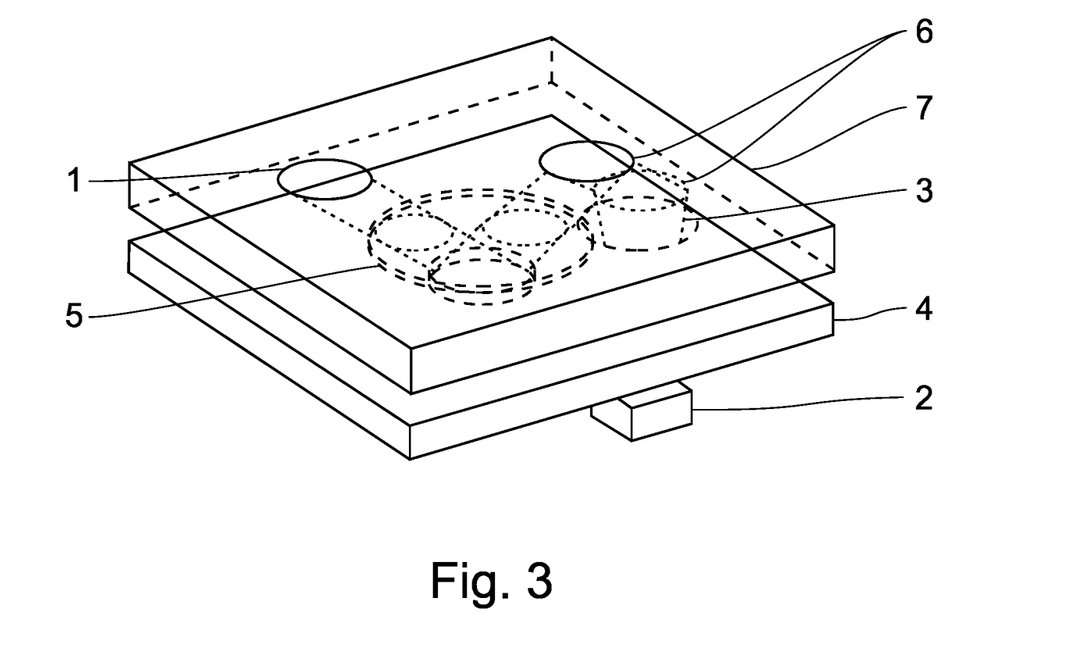
FIG. 3 a view of a third embodiment of a device for generating and displaying an image on the observation field with the light source, two additional optical elements, the diffractive element arranged at the waveguide, the microscanner and the beam path of the light bundle.

In the third embodiment of the device for generating and displaying an image on the observation field 1 which is illustrated in FIG. 3, the light source 2 is arranged below the microscanner 4. A cutout is inserted in the microscanner 4 through which the light bundle 3 can arrive at the waveguide 7 through the microscanner 4. An additional optical element 6 which is configured to collimate and deflect the light bundle 3 is arranged at the underside of the waveguide 7. A further additional optical element 6 which is configured to deflect the light bundle 3 in direction of the microscanner 4 is arranged at the upper side of the waveguide 7. As a result of the diffractive element 5, the light bundle 3 is incident in the microscanner 4 obliquely or at an angle. The beam cross section of the light bundle 3 is illustrated by dashed lines at the locations through which the light bundle 3 passes through the diffractive element 5. The light bundle 3 is deflected in direction of the observation field 1 through the microscanner 4 and once again impinges on the diffractive element 5.

Figure 4:
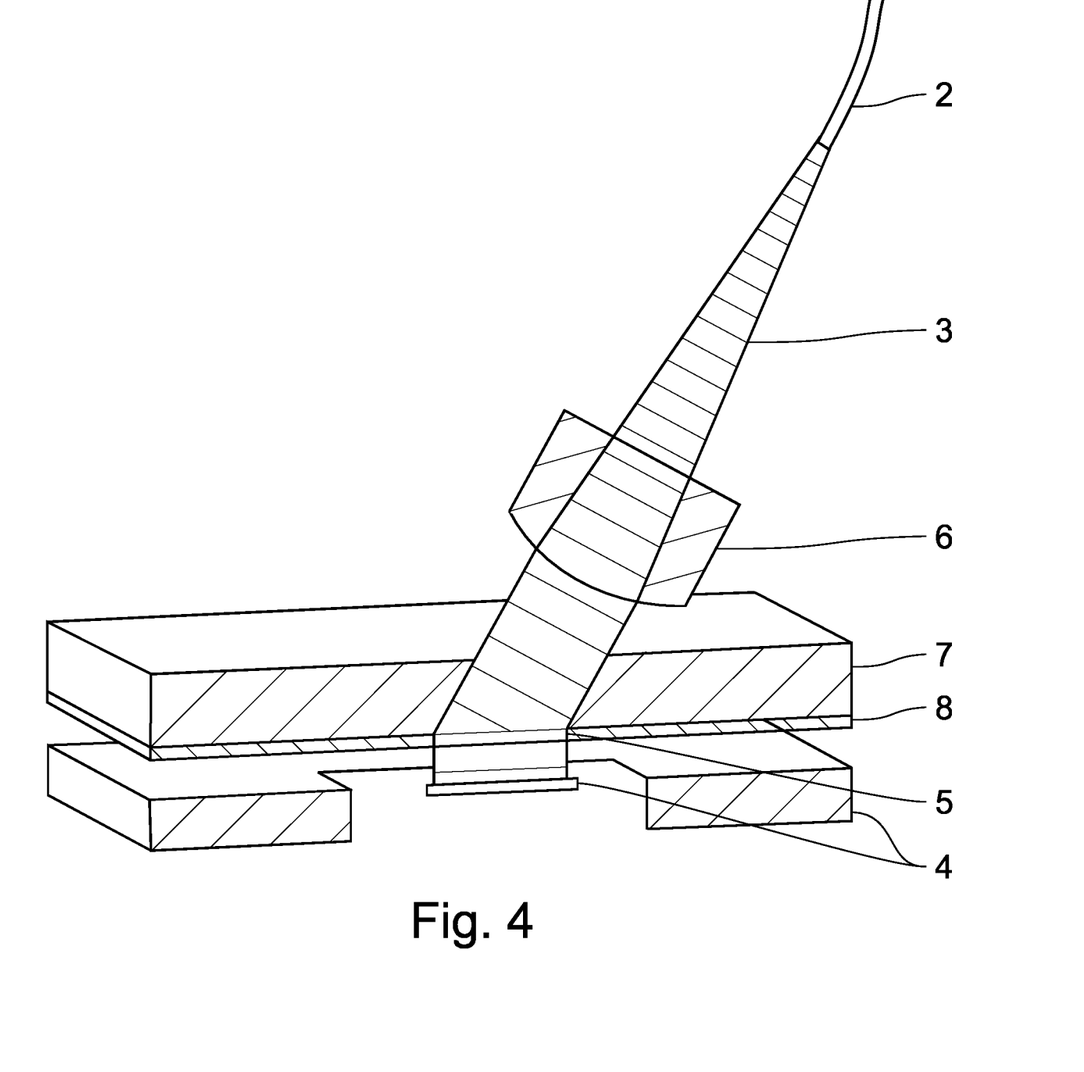
FIG. 4 a section through a view of a fourth embodiment of a device for generating and displaying an image on the observation field, with the light source, the additional optical element, the diffractive element arranged at the waveguide, a cover glass, the microscanner and the beam path of the light bundle.

FIG. 4 shows a fourth embodiment of a device for generating and displaying an image on the observation field 1. The light source 2 is constructed as a fiber-coupled light source and emits a divergent light bundle 3. After being coupled out of the fiber-coupled light source, the light bundle 3 impinges on the additional optical element 6. The additional optical element 6 is arranged in the beam path of the light bundle 3 between the light source 2 and the waveguide 7 and is configured to collimate the divergent light bundle 3. The additional optical element 6 is constructed as a refractive element in the fourth embodiment example. After the light bundle 3 enters the waveguide 7, the light bundle 3 is deflected in direction of the microscanner 4 and collimated through the diffractive element 5 before impinging on the microscanner 4.

A cover glass 8 is arranged on the outer side of the waveguide 7 facing the microscanner 4 in order to protect the waveguide 7 and the diffractive element 5 against external factors.

Figure 5:
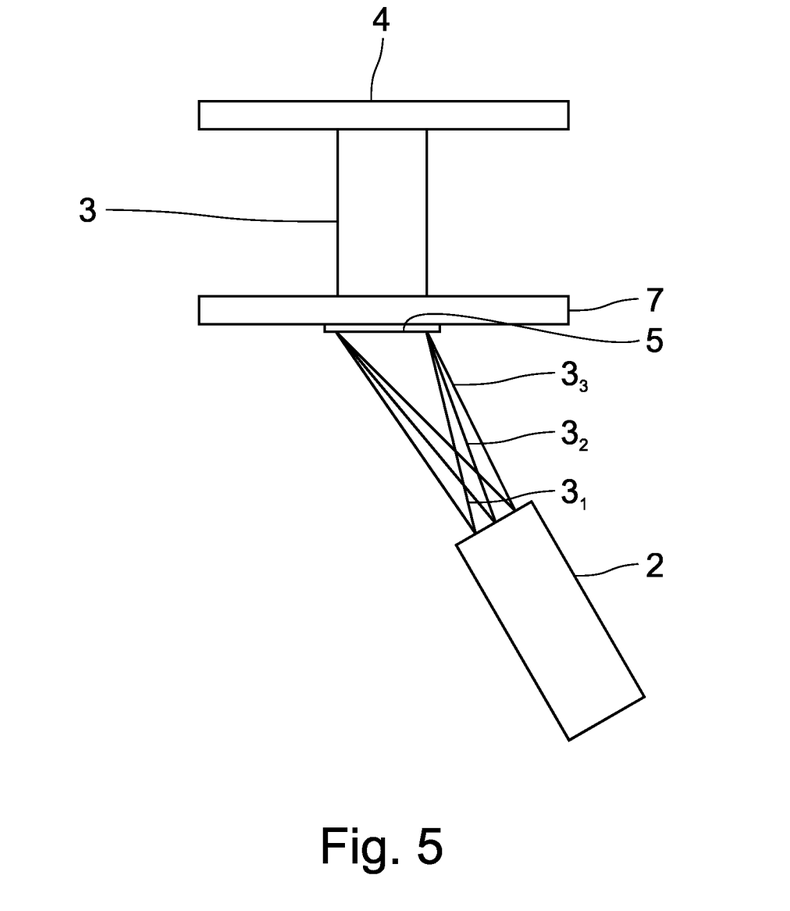
FIG. 5 a view of a fifth embodiment of a device for generating and displaying an image on the observation field, with the light source, the diffractive element arranged on the waveguide, the microscanner and the beam path of a plurality of light bundles.

FIG. 5 shows a fifth embodiment of a device for generating and displaying an image on the observation field 1 in which the light source 2 is configured to emit a plurality of light bundles $3_1$, $3_2$, $3_3$ with spectral compositions differing from one another in pairs or with like spectral composition. The light source 2 emits three light bundles $3_1$, $3_2$, $3_3$ in direction of the diffractive element 5. The light bundles $3_1$, $3_2$, $3_3$ are deflected by the diffractive element 5 in direction of the microscanner 4, collimated and combined to form an individual light bundle 3.

For purposes of better comprehension, FIGS. 1-5 show only one or two of many possible beam paths that the light bundle 3 can take after deflection through the microscanner 4.

REFERENCE CHARACTERS 1 observation field
2 light source
3 (combined) light bundle
$3_1$ light bundle
$3_2$ light bundle
$3_3$ light bundle
4 microscanner
5 diffractive element
6 additional optical element
7 waveguide
8 cover glass

The invention claimed is:

1. A device for generating and displaying an image on an observation field provided for overlaying information and images, comprising:
at least one light source for emitting at least one divergent light beam;
a microscanner for variable deflection of the at least one light beam in a direction of the observation field, wherein the microscanner has at least one axis of rotation for a rotational oscillating movement for deflecting the at least one light beam, is formed as a microelectromechanical system, and is configured to bring about a nonlinear Lissajous projection on the observation field;
a waveguide which is arranged in a beam path of the at least one light beam between the at least one light source and the microscanner; and
a diffractive element which is arranged on or in the waveguide in such a way that:
the light beam emitted by the at least one light source is transmitted through the diffractive element before it reaches the microscanner, and
a light beam deflected by the microscanner is coupled into the waveguide through the diffractive element.

2. The device according to claim 1, wherein the diffractive element is formed to split the light beam emitted by the at least one light source.

3. The device according to claim 1, wherein the diffractive element is formed as grating.

4. The device according to claim 1, wherein the diffractive element is configured to shape a beam cross section of the at least one light beam in order to reduce an ellipticity of the at least one light bundle.

5. The device according to claim 1, wherein the diffractive element is configured to influence astigmatisms of the at least one light beam.

6. The device according to claim 1, wherein the diffractive element is configured to collimate the light beam emitted by the at least one light source.

7. The device according to claim 1, wherein the diffractive element is configured to deflect the light beam emitted by the at least one light source.

8. The device according to claim 1, wherein the at least one light source is formed as an edge emitter, a surface emitter or a fiber-coupled light source.

9. The device according to claim 1, wherein the at least one light source is configured to emit a plurality of light beams with spectral compositions differing from one another in pairs.

10. The device according to claim 1, wherein the at least one light source is formed to emit a plurality of light bundles of identical spectral composition.

11. The device according to claim 1, wherein the waveguide is an eyeglass lens of augmented reality goggles.

12. Augmented reality goggles comprising a device for generating and displaying images according to claim 1.

* * * * *